United States Patent
Yamano et al.

(10) Patent No.: US 9,160,867 B2
(45) Date of Patent: Oct. 13, 2015

(54) INFORMATION PROCESSING SYSTEM FOR PREVENTING JOB PROCESS FROM BEING REDUNDANTLY PERFORMED, INFORMATION PROCESSING APPARATUS, AND PROGRAM

(71) Applicants: Kenta Yamano, Kanagawa (JP); Masateru Kumagai, Kanagawa (JP); Tomoya Amikura, Tokyo (JP); Yuuichiroh Hayashi, Kanagawa (JP)

(72) Inventors: Kenta Yamano, Kanagawa (JP); Masateru Kumagai, Kanagawa (JP); Tomoya Amikura, Tokyo (JP); Yuuichiroh Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/556,304

(22) Filed: Dec. 1, 2014

(65) Prior Publication Data

US 2015/0156340 A1 Jun. 4, 2015

(30) Foreign Application Priority Data

Dec. 2, 2013 (JP) ................................. 2013-249143

(51) Int. Cl.
*G06F 3/12* (2006.01)
*H04N 1/00* (2006.01)

(52) U.S. Cl.
CPC ......... *H04N 1/00042* (2013.01); *H04N 1/0005* (2013.01); *H04N 1/00244* (2013.01); *H04N 2201/0094* (2013.01)

(58) Field of Classification Search
CPC ............ H04N 1/00042; H04N 1/0005; H04N 1/00244; H04N 2201/0094
USPC .................. 358/1.1–3.29, 1.11–1.18
See application file for complete search history.

(56) References Cited

U.S. PATENT DOCUMENTS

| | | | |
|---|---|---|---|
| 8,219,684 B1 * | 7/2012 | Dean ............................ | 709/226 |
| 8,549,536 B2 * | 10/2013 | Vasil et al. ................... | 718/106 |
| 8,565,635 B2 | 10/2013 | Yamada | |
| 2011/0205585 A1 * | 8/2011 | Mihara et al. ................ | 358/1.15 |
| 2013/0198211 A1 | 8/2013 | Kohkaki et al. | |

FOREIGN PATENT DOCUMENTS

| | | |
|---|---|---|
| JP | 2008-310419 | 12/2008 |
| JP | 2011-123881 | 6/2011 |
| JP | 2012-040783 | 3/2012 |
| JP | 2013-178748 | 9/2013 |

* cited by examiner

*Primary Examiner* — Marcellus Augustin
(74) *Attorney, Agent, or Firm* — IPUSA, PLLC (57) ABSTRACT

An information processing system including at least one information processing apparatus includes a holding unit holding a processing request waiting for a processing; processing units monitoring the holding unit, acquiring the processing request and performing the processing corresponding to the processing request; and a memory unit storing information of a state of the processing request, wherein each processing unit includes a state acquiring unit acquiring information indicative of the state of the acquired processing request from the memory unit, and a state controlling unit checking the information indicative of the state of the acquired processing request, and controlling whether the processing corresponding to the acquired processing request is preformed based on a result of checking the information indicative of the state of the acquired processing request.

3 Claims, 9 Drawing Sheets

| JOB ID | PROCESS worker | STATE | ENGINE NAME | CREATION TIME | UPDATE TIME |
|---|---|---|---|---|---|
| 1 | worker2 | NOW PROCESSING | htmlcpdf | 2013-08-29T04:14:14Z | 2013-08-29T04:14:14Z |
| 2 | worker1 | COMPLETION | office2rpcs | 2013-08-29T04:19:14Z | 2013-08-29T04:19:14Z |
| 3 | worker2 | ERROR | pdf2pcl | 2013-08-29T04:22:14Z | 2013-08-29T04:22:14Z |
| 4 | worker1 | COMPLETION | image2pdf | 2013-08-29T04:25:54Z | 2013-08-29T04:25:54Z |
| 4 | worker2 | NOW PROCESSING | pdf2rpcs | 2013-08-29T04:32:13Z | 2013-08-29T04:32:13Z |

JOB ID: 1
PROCESS worker: worker1
STATUS: NOW PROCESSING
ENGINE NAME: html2pdf
CREATION TIME: 2013-08-29T04:14:14Z
UPDATE TIME: 2013-08-29T04:14:14Z
JUDGEMENT TIME: TEN MINUTES

INFORMATION PROCESSING SYSTEM FOR PREVENTING JOB PROCESS FROM BEING REDUNDANTLY PERFORMED, INFORMATION PROCESSING APPARATUS, AND PROGRAM

BACKGROUND OF THE INVENTION

1. Field of the Invention

The present invention relates to an information processing apparatus, an information processing system, and a program.

2. Description of the Related Art

There is known an asynchoronous conversion server including a data conversion request managing means, a message queue, a job information management database, and multiple converting means. The multiple converting means monitors a queue corresponding to the message queue and performs a process corresponding to a request included in the queue (for example, Patent Document 1).

The job process apparatus such as a worker monitoring the queue corresponding to a message queue maintains an association (a connection) with the message queue while the job process apparatus performs a job process corresponding to a request included in the queue.

However, there is a case where the connection between the message queue and the job process apparatus is cut while the job is being processed. The message queue, of which connection with the job process apparatus is cut, updates a request issued by the job process apparatus, of which connection with the message queue is cut, while the job is being processed to be again in a state where the job process apparatus can acquire the request.

Therefore, there is a problem that the job process apparatus and another job process apparatus redundantly perform the job process corresponding to the request included in the queue when the job process apparatus cannot check that the other job process apparatus is processing the job.

Patent Document 1: Japanese Laid-Open Patent Publication No. 2013-178748

SUMMARY OF THE INVENTION

The embodiments of the present invention provide a novel and useful information processing system, an information processing apparatus, and a program in consideration of the above preventing redundant processes from being performed.

One aspect of the embodiments of the present invention may be to provide an information processing system including at least one information processing apparatus including a holding unit that holds a processing request waiting for a processing; a plurality of processing units that monitors the holding unit, acquires the processing request waiting for the processing which is held by the holding unit, and performs the processing corresponding to the processing request waiting for the processing; and a memory unit that stores information of a state of the processing request, wherein each of the plurality of processing units includes a state acquiring unit that acquires information indicative of the state of the acquired processing request waiting for the processing from the memory unit, and a state controlling unit that checks the information indicative of the state of the acquired processing request waiting for the processing, and controls whether the processing corresponding to the acquired processing request waiting for the processing is preformed based on a result of checking the information indicative of the state of the acquired processing request waiting for the processing.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

DETAILED DESCRIPTION OF THE PREFERRED EMBODIMENTS

A description is given below, with reference to the FIG. 1 through FIG. 12 of embodiments of the present invention. Where the same reference symbols are attached to the same parts, repeated description of the parts is omitted.

Reference symbols typically designate as follows:

1: job process system;
10: job request apparatus;
11: job management apparatus;
12: common file storage;
13: job process management apparatus;
14: job process apparatus;
21: job information management database (DB);
22: job request management unit;
23: message queue (MQ);
24: task information table;
31: message acquisition unit;
32: job information acquisition unit;
33: task information acquisition unit;
34: state control unit;
35: data acquisition unit;

36: job process performing unit;
37: message queue control unit;
100: computer;
101: input device;
102: display device;
103: external I/F;
103a: recording medium;
104: RAM;
105: ROM;
106: CPU;
107: communication I/F;
108: HDD;
B: bus;
N1: network.

An embodiment of the present invention is described with reference to figures. Within the embodiment, a job process system as an example of an information processing system is described.

[First Embodiment]

<System Structure>

Figure 1:
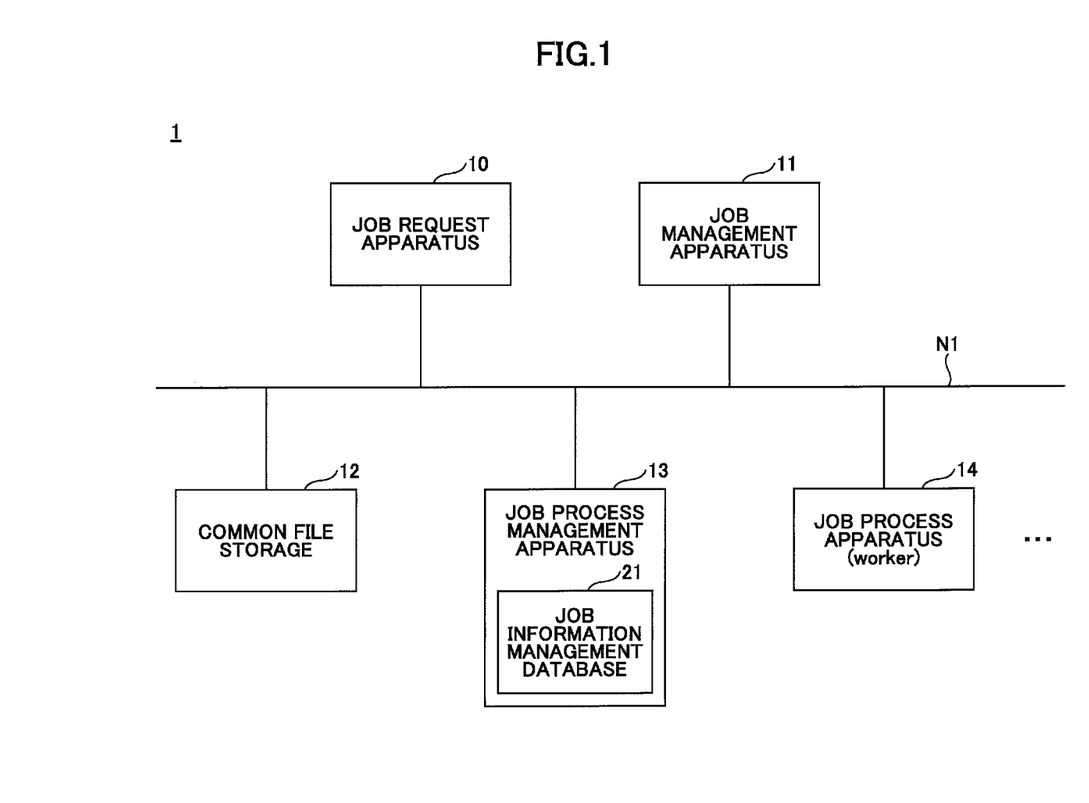
FIG. 1 illustrates a structure of an example of a job process system of an embodiment of the present invention.

FIG. 1 illustrates a structure of an example of a job process system of the first embodiment of the present invention. The job process system 1 has a structure connecting a job request apparatus 10, a job management apparatus 11, a common file storage 12, a job process management apparatus 13, and multiple job process apparatuses 14 through a network N1 such as a LAN, the Internet, or the like.

The job request apparatus 10 receives a registration request to register a job such as a print request from a user and requests the registration of the job to the job management apparatus 11. The job request apparatus 10 may be a device or an apparatus which can request the job management apparatus 11 to register the job such as a general purpose PC, a multifunction peripheral, or the like. For example, the job request apparatus 10 may be a terminal device such as a smartphone or a mobile phone.

The job management apparatus 11 receives a request to register the job from the job request apparatus 10 and registers data included in the job in the common file storage 12. Further, the job management apparatus 11 determines a process necessary for the job and sends a request to process the job to the job process management apparatus 13.

When the job process management apparatus 13 receives the request to process the job from the job management apparatus 11, the job process management apparatus 13 enters a message corresponding to the request to process the job into a queue of a message queue corresponding to the job process. The job process management apparatus 13 registers the job information corresponding the received request to a job information management database 21.

The job process apparatus 14 such as a worker monitors the queue of the corresponding message queue. If the message is entered into the queue which is monitored, job information of the request corresponding to the message is acquired. Further, the job process apparatus 14 acquires data corresponding to the request from the common file storage 12 based on the acquired job information.

At this time, the job process apparatus 14 checks a state of the task information table corresponding to the acquired job information and performs a different process based on a result of the check. A detailed different process based on the result of checking the state of the task information table is described later. In a case where the job process is determined to be performed based on the result of checking the state of the task information table, the job process apparatus 14 performs a job process corresponding to the request.

Specifically, the job process apparatus 14 performs the job process corresponding to the request with respect to the data corresponding to the request. There is a case where the job process apparatus 14 registers the data after processing the job into the common file storage 12. Further, the job process apparatus 14 performs a rewriting process to update the job information registered in the job information management database 21 based on the result of the job process.

Meanwhile, the different process based on the result of checking the state of the task information table in the job process system 1 of the first embodiment is provided to prevent from redundantly performing the process by the job process apparatus 14 as described later. The structure of the job process system 1 illustrated in FIG. 1 is an example and may be another structure.

<Hardware Structure>

Figure 2:
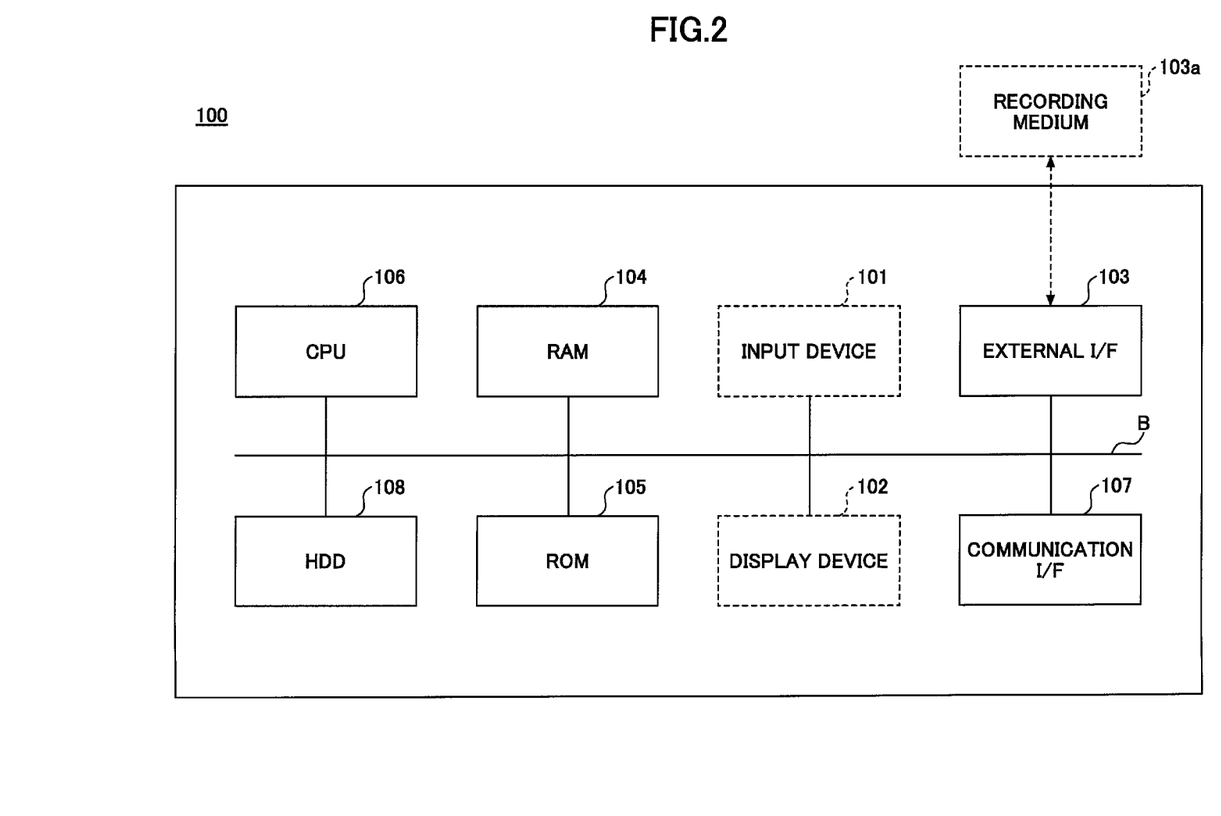
FIG. 2 illustrates a structure of an example of a hardware structure of a computer of the embodiment.

For example, the job request apparatus 10, the job management apparatus 11, the common file storage 12, the job process management apparatus 13, and the job process apparatus 14 illustrated in FIG. 1 is substantialized by a computer or the like having a hardware structure illustrated in FIG. 2. FIG. 2 illustrates an exemplary hardware structure of the computer of the first embodiment.

Referring to FIG. 2, the computer system 100 includes an input device 101, a display device 102, an external I/F 104, a RAM 105, a ROM 106, a CPU 108, a communication I/F 107, a HDD 108, and so on, mutually connected by a bus B. It is acceptable to provide a structure such that the input device 101 and the display apparatus 102 may be connected to the bus B when necessary.

The input device 101 includes a keyboard, a mouse, or the like, by which the user inputs various operation signals. The display device 102 includes a display or the like to display a processing result obtained by the computer 100.

The communication I/F 107 is an interface provided to connect the computer 100 with the network N1. Thus, the computer 100 can perform data communications through the communication I/F 107.

The HDD 108 is a non-volatile memory device storing programs and/or data. The program and/or data to be stored are an OS being basic software controlling the entire computer 100, application software providing various functions in the OS, and so on.

The external I/F 103 is an interface with an external apparatus. The external apparatus is a recording medium 103a or the like. With this, the computer 100 can read information from the recording medium 103a and/or write information to the recording medium 103a through the external I/F 103. The recording medium 103a is a flexible disk, a CD, a DVD, an SD memory card, a USB memory, or the like.

The ROM 105 is a non-volatile semiconductor memory (a memory device), which can hold a program and/or data even when a power source is powered off. The ROM 105 stores programs and data such as basic input/output system (BIOS), OS setup, network setup, or the like, which are executed at a time of booting up the computer 100. The RAM 104 is a volatile semiconductor memory temporarily storing a program or data.

The CPU 106 reads the program and/or data from the memory device such as the ROM 105, the HDD 108, or the like. The read program or the read data undergo the process to thereby substantialize controls or functions of the entire computer 100.

For example, the job request apparatus 10, the job management apparatus 11, the common file storage 12, the job process management apparatus 13, and the job process apparatus 14 of the first embodiment can substantialize various processes by a hardware structure of the above computer 100.
<Software Structure>
<<Job Process Management Apparatus>>

Figure 3:
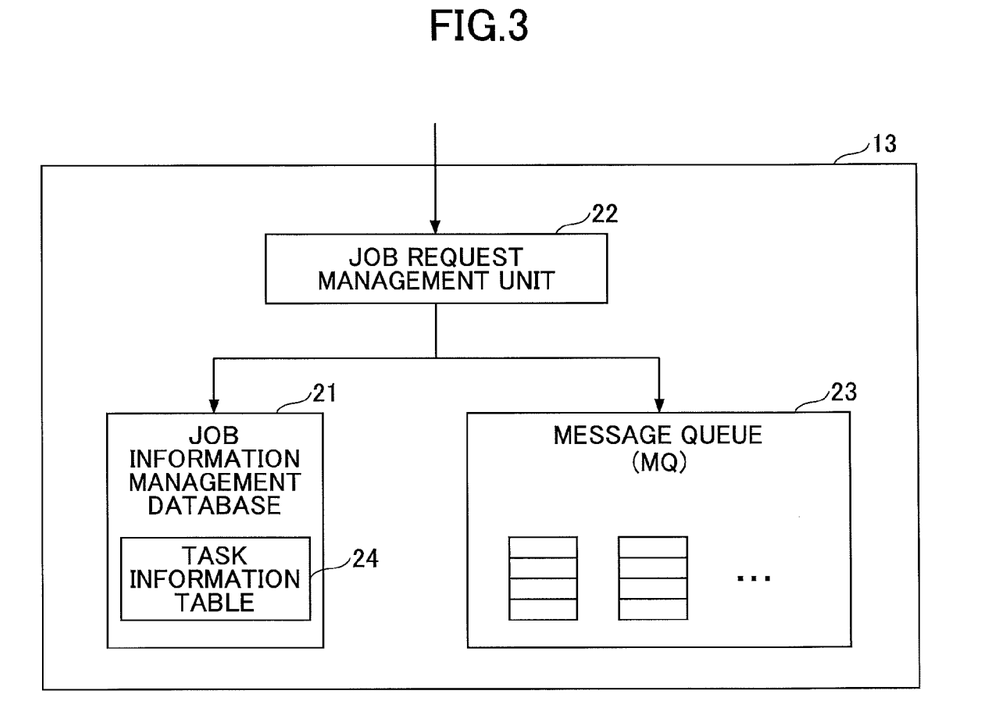
FIG. 3 is a processing block chart of an example of a job processing apparatus of the embodiment.

The job process management apparatus 13 of the first embodiment is substantialized by the processing block illustrated in, for example, FIG. 3. FIG. 3 is a processing block chart of an example of the job process management apparatus of the first embodiment.

When the job process management apparatus 13 illustrated in FIG. 3 executes a program by, for example, a CPU and/or a memory device which are included in the job process management apparatus 13, the job information management database 21, the job request management unit 22, and the message queue are substantialized. The job process management apparatus 13 provides an asynchronous job process service together with the job process apparatus 14.

The job request management unit 22 receives a request for the job process sent from the job management apparatus 11. The job request management unit 22 analyzes the request for the job process and enters a message corresponding to the request for the job process into a queue of the message queue 23 corresponding to the job process.

Further, the job request management unit 22 registers the job information corresponding to the request for the job process sent from the job management apparatus 11 into a job information management database simultaneously at a time of entering the message to the message queue 23.

The job information registered in the job information management database 21 includes a place (URI in the common file storage 12) where data of the job is registered, a kind of the job process, a state of the request, and so on. The state of the request includes "before process", "now processing", "completion", and "error" or the like. The state of the request indicates the state of the job process.

The task information table 24 described below is registered in the job information management database 21. The state of the task forming the job is included in the task information table 24 as described later. The state of the task includes "now processing", "completion", and "error" or the like. The state of the task indicates the state of the task process forming the job.

The message queue 23 includes queues monitored by multiple job process apparatuses 14. The queues are provided for each kind of the job process. The message corresponding to a request whose kind of the job process matches that of the queue is entered into the queue. The message entered into the queue is acquired by the job process apparatus 14 monitoring the queue.
<<Job Process Apparatus>>

Figure 4:
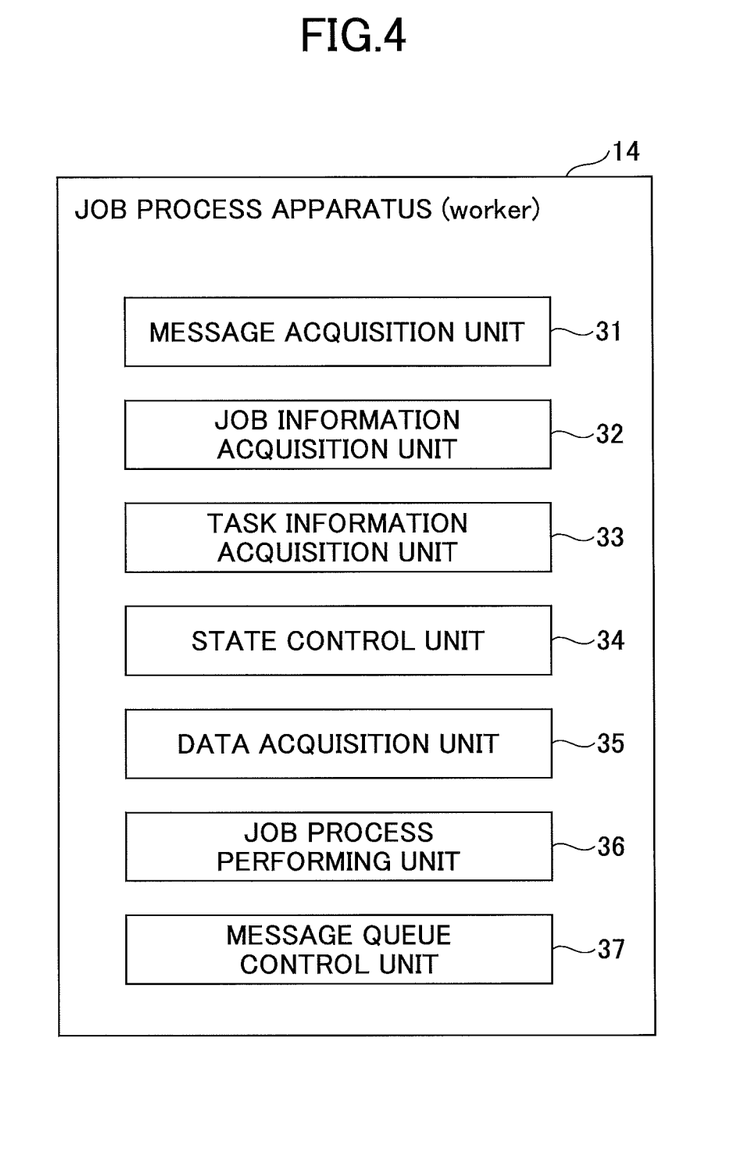
FIG. 4 is a processing block chart of an example of a job process apparatus of the embodiment.

The job process apparatus 14 of the first embodiment is substantialized by the processing block illustrated in, for example, FIG. 4. FIG. 4 is a processing block chart of an example of the job process management apparatus of the first embodiment. The job process apparatus 14 substantializes a message acquisition unit 31, a job information acquisition unit 32, a task information acquisition unit 33, a state control unit 34, a data acquisition unit 35, a job process performing unit 36, and a message queue control unit 37 by executing a program using, for example, a CPU included in the job process apparatus 14.

The message acquisition unit 31 monitors the queue of the corresponding message queue 23. When the message is entered into the queue which is monitored, the message is acquired. The job information acquisition unit 32 acquires the job information of the request corresponding to the message acquired by the message acquisition unit 31 from the job information management database 21.

The task information acquisition unit 33 acquires task information corresponding to the job information acquired by the job information acquisition unit 32 from the task information table 24. The state control unit 34 checks the state of task corresponding to the task information acquired by the task information acquisition unit 33 and performs a different process described later based on a result of checking the state of the task. In a case where the state control unit 34 determines to perform the job process, the data acquisition unit 35 acquires data corresponding to the request from the common file storage 12 based on the job information acquired by the job information acquisition unit 32.

Specifically, the job process performing unit 36 performs the job process corresponding to the request with respect to the data corresponding to the request. Further, the job process performing unit 36 performs a rewriting process to update the job information registered in the job information management database 21 based on the result of the job process.

The message queue control unit 37 controls the message queue 23 as described below in response to the state of the task corresponding to the task information checked by the state control unit 34. For example, the message queue control unit 37 causes the message queue 23 to perform deletion of the message in the queue of the message queue, update to a state where reregistration (requeue) of the message or acquisition (pop) of the message are possible, or the like. The message queue 23 is controlled by the message queue control unit 37 by an instruction such as a command or a report of information.

When the job process apparatus 14 preforms the job process formed by multiple tasks, after performing one task process, a message is entered into the queue of the message queue 23 corresponding to the next task process.

Figure 5:
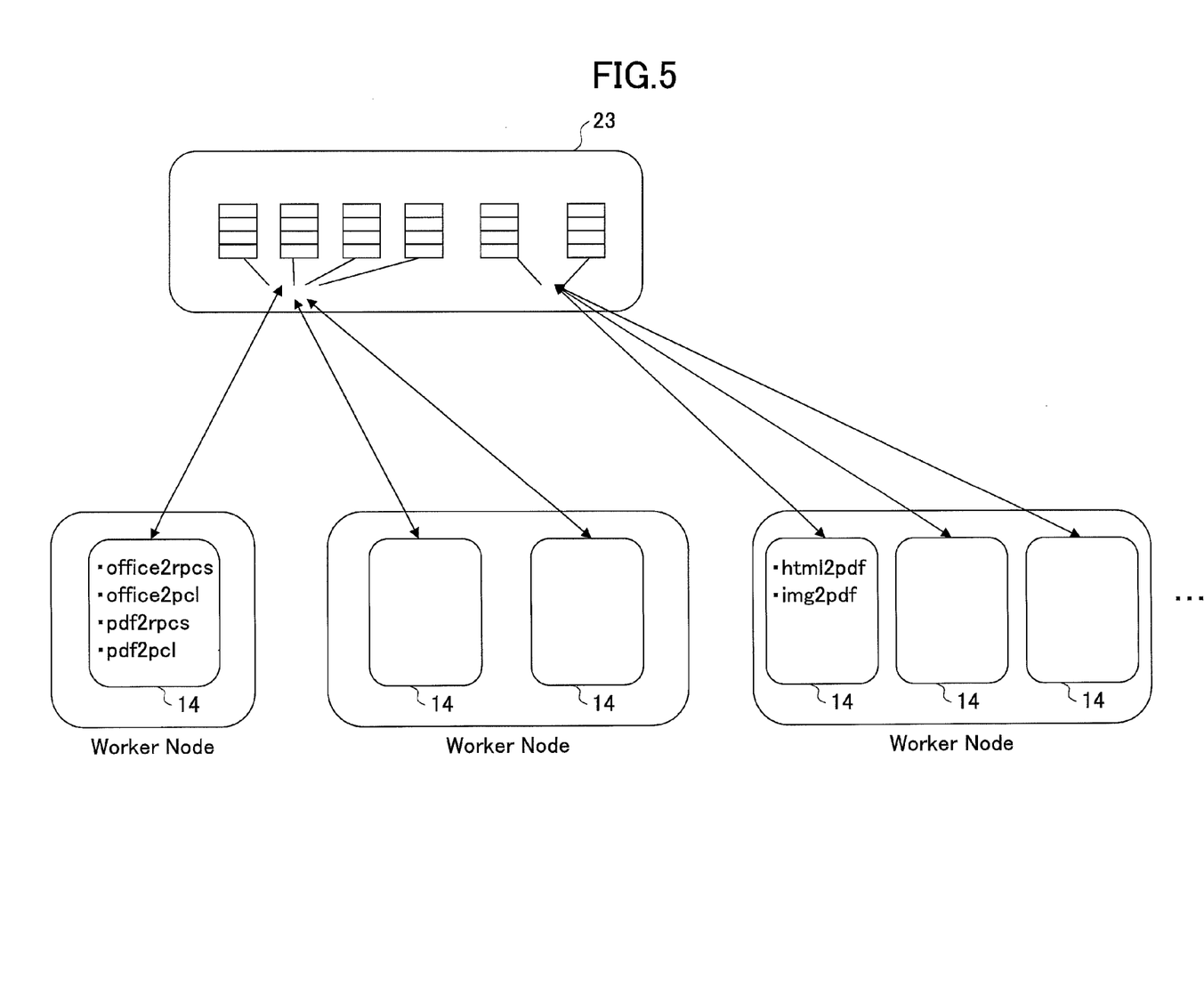
FIG. 5 is an explanatory chart of an example of associating a queue with a job process apparatus.

The queue of the message queue 23 and the job process apparatus 14 are associated as illustrated in, for example, FIG. 5. FIG. 5 is an explanatory chart of an example of associating the queue with the job process apparatus 14.

The message queue 23 includes multiple queues. The queues are separated for each kind of the job process (a task process). The job process apparatus 14 may be substantialized by a program run in a worker node such as an information processing apparatus. Referring to FIG. 5, one to three job process apparatuses 14 are substantialized in one worker node.

Referring to FIG. 5, the job process apparatus 14 can perform job processes (data conversions) of, for example, "office2rpcs", "office2 pcl", "pdf2rpcs", and "pdf2 pcl". Referring to FIG. 5, the job process apparatus 14 can perform job processes (data conversions) of, for example, "html2pdf" and "image2pdf".

As illustrated in FIG. 5, the job process apparatus 14 monitors a message of at least one queue by polling. Therefore, the queues of the message queue 23 are monitored by polling from multiple job process apparatuses 14. If there is the message which can be acquired (pop) in the queue monitored by polling, the job process apparatus 14 performs the job process. The message queue 23 updates the state where the message previously acquired by the job process apparatus 14 cannot be acquired to prevent another job process apparatus 14 from redundantly performing the job process.
<<Task Information Table>>

Figure 6:
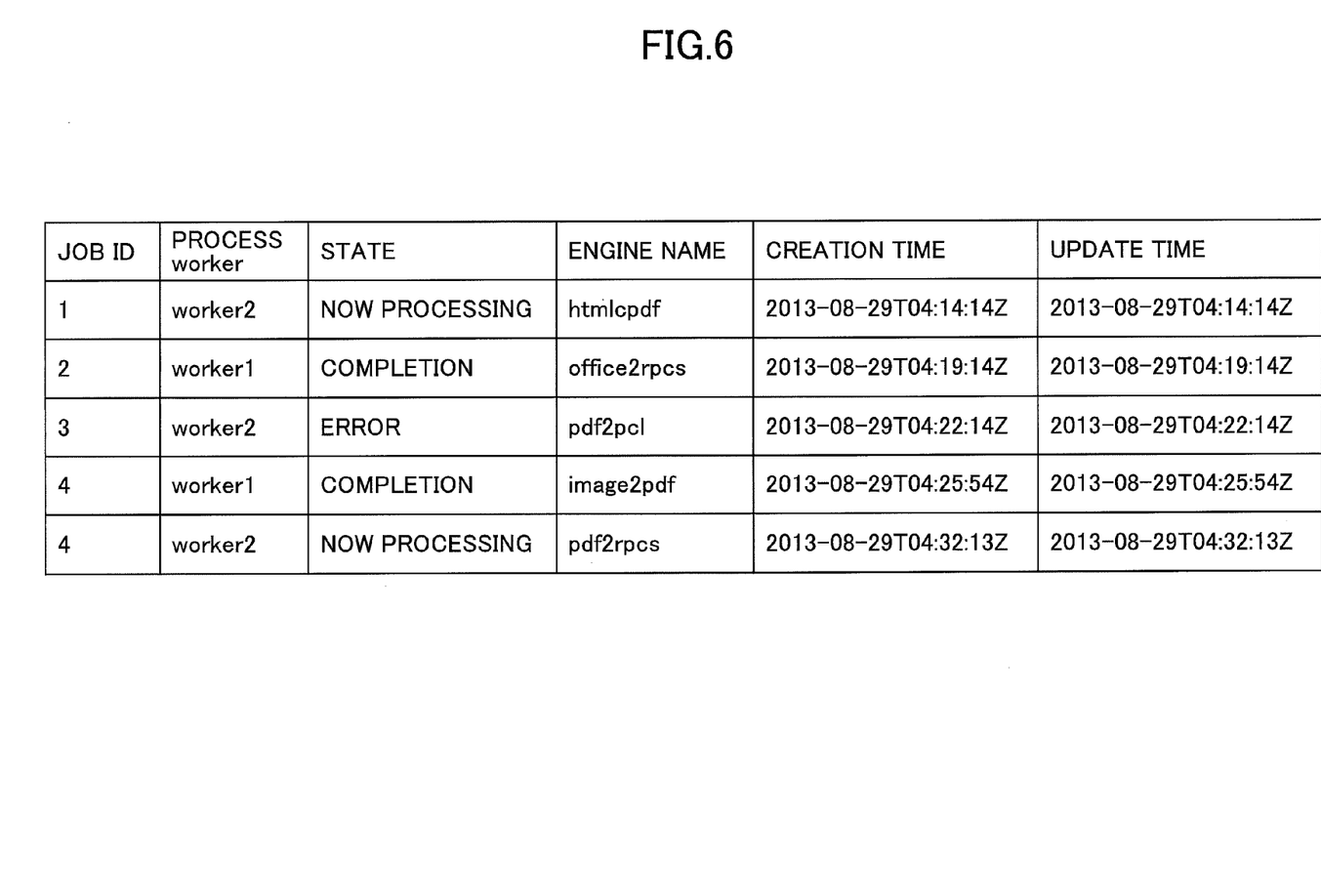
FIG. 6 illustrates a structure of an example of a task information table.

FIG. 6 illustrates a structure of an example of the task information table. The task information table 24 illustrated in FIG. 6 includes items of a job ID, process worker, a state, an engine name, a creation time, and an update time.

The job ID is an example of identification information for identifying jobs. A task indicated by each record of the task information table 24 illustrated in FIG. 6 is included in the job identified by the job ID. The process worker is an example of the identification information for identifying the job process apparatus 14 performing the task process. The state indicates a state of the task process. The engine name represents the kind of the task process. The creation time indicates a time when the task information is created. The update time indicates a time when the task information is updated.

The first and fifth records are examples of the task information of the task process during the process. The second and fourth records are examples of the task information of the task process which has been completed. The third record is an example of the task information of the task process which is erroneous.

As for the fourth and fifth records illustrated in FIG. 6, the job IDs are the same and the engine names are different. Therefore, the fourth and fifth records are different task processes included in the same job. Therefore, the fourth and fifth records illustrated in FIG. 6 are different from the process of preventing from redundantly performing the process of the first embodiment.

<Detailed Process>

Hereinafter, the different process performed based on a result of checking the state of the task of the task information in the process of the job process system 1 of the first embodiment is described. The explanation is appropriately omitted for a portion unnecessary for the description of the embodiment.

Figure 7:
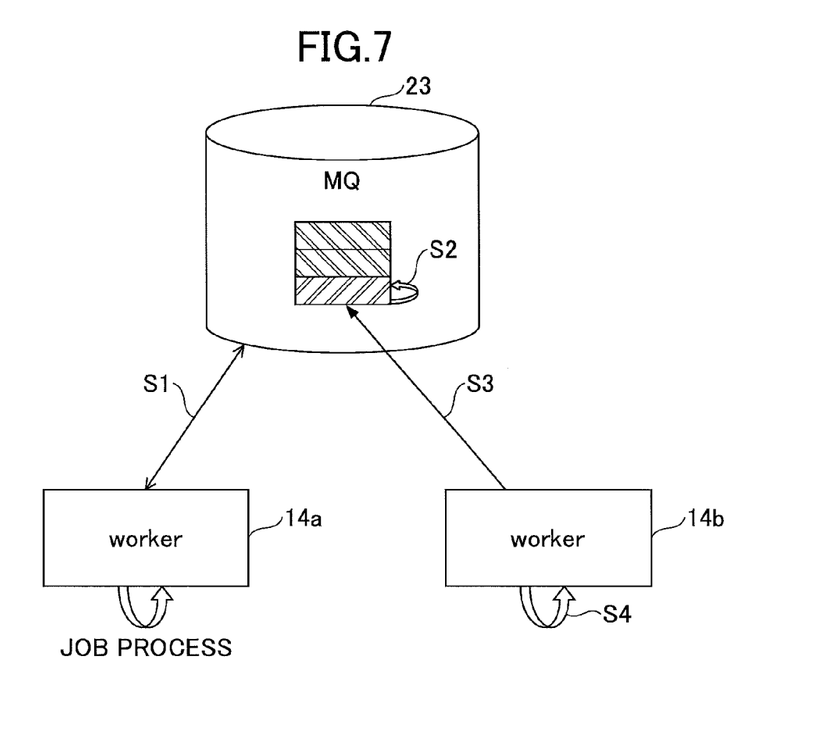
FIG. 7 is an explanatory chart illustrating a problem caused at a time of cutting off a connection between a message queue and the process apparatus.

FIG. 7 is an explanatory chart illustrating a problem caused at a time of cutting off a connection between the message queue and the process apparatus. The job process apparatus (worker) 14a acquires a message from the message queue (hereinafter, referred to as MQ) 23 and is performing the job process. Ordinarily, while the job process apparatus 14a is performing the job process, the MQ 23 maintains a connection with the job process apparatus 14a.

In step S1, the MQ 23 detects that the connection with the job process apparatus 14a is cut off. However, the job process apparatus 14a performs the job process after the connection with the MQ 23 is cut off. The MQ 23, which detects that the connection with the job process apparatus 14a is cut off, updates the message acquired by the job process apparatus 14a so as to be in a state where the message can be acquired in step S2.

In step S3, the job process apparatus 14b monitoring the same queue of the MQ 23 as that in the job process apparatus 14a acquires the message updated so as to be acquired in step S2 and performs the same job process as that in the job process apparatus 14a.

As described, because the job process apparatus 14b cannot check that the job process of the message acquired from the MQ 23 is being processed (during the process), there is a problem that the job process is redundantly performed in the job process apparatus 14a and the job process apparatus 14b.

Then, even if the connection between the job process apparatus 14 and the MQ 23 is cut off in the job process system 1 of the first embodiment, the following process is performed so that the job process is not redundantly preformed.

Figure 8:
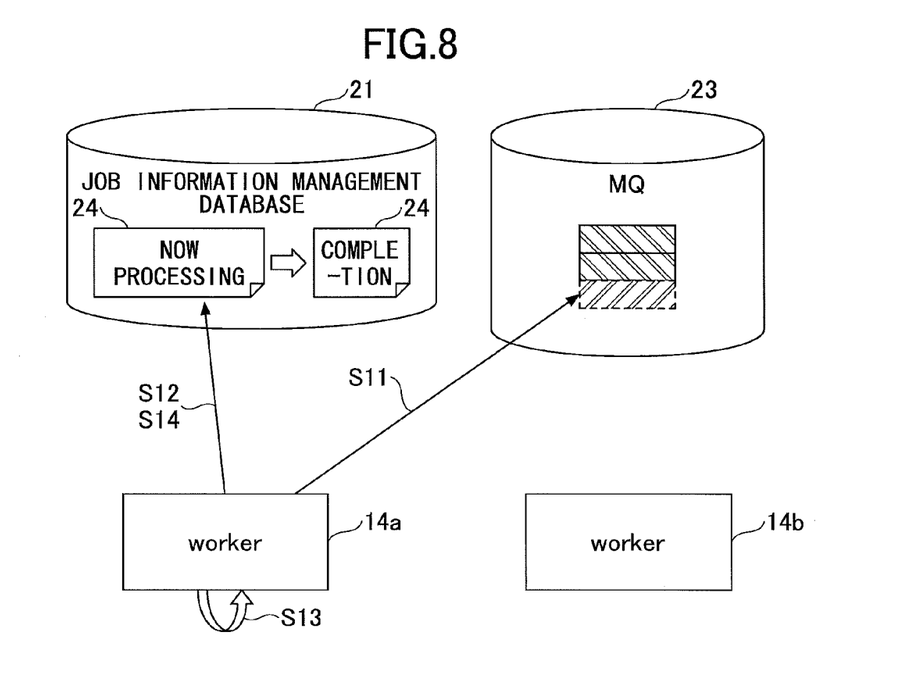
FIG. 8 is an explanatory chart illustrating an example indicative of a procedure when the connection between the message queue and the job process apparatus is not cut off in the job process system of the embodiment.

FIG. 8 is an explanatory chart illustrating an example indicative of a procedure when the connection between the MQ and the job process apparatus is not cut off in the job process system of the first embodiment. In step S11, the job process apparatus 14 acquires the message from the queue monitoring the MQ 23. The MQ 23 updates the message acquired by the job process apparatus 14a to be in a state where the message previously acquired by the job process apparatus cannot be acquired.

In step S12, the job process apparatus 14a acquires task information of the task information table 24 and checks whether the task information of the job process corresponding to the message acquired from the MQ 23 in step S11 is written in the task information table 24.

If the task information of the job process corresponding to the message acquired from the MQ 23 in step S11 is written in the task information table 24, the job process apparatus 14a checks the state of the task information and performs the different process based on the result of checking the state of the task information as described below. Here, the explanation is given on the premise that the task information of the job process corresponding to the acquired message is not written in the task information table 24.

In step S12, the job process apparatus 14a writes the state of the task of "now processing" into the task information table 24. In step S13, the job process apparatus 14a performs the job process. After the job process is completed, the job process apparatus 14a goes to step S14 and requests the job information management database 21 to update the state of the task of the completed job process from "now processing" to "completion". Meanwhile, the state control unit 34 of the job process apparatus 14 requests the job information management database 21 to update the state of the task.

Figure 9:
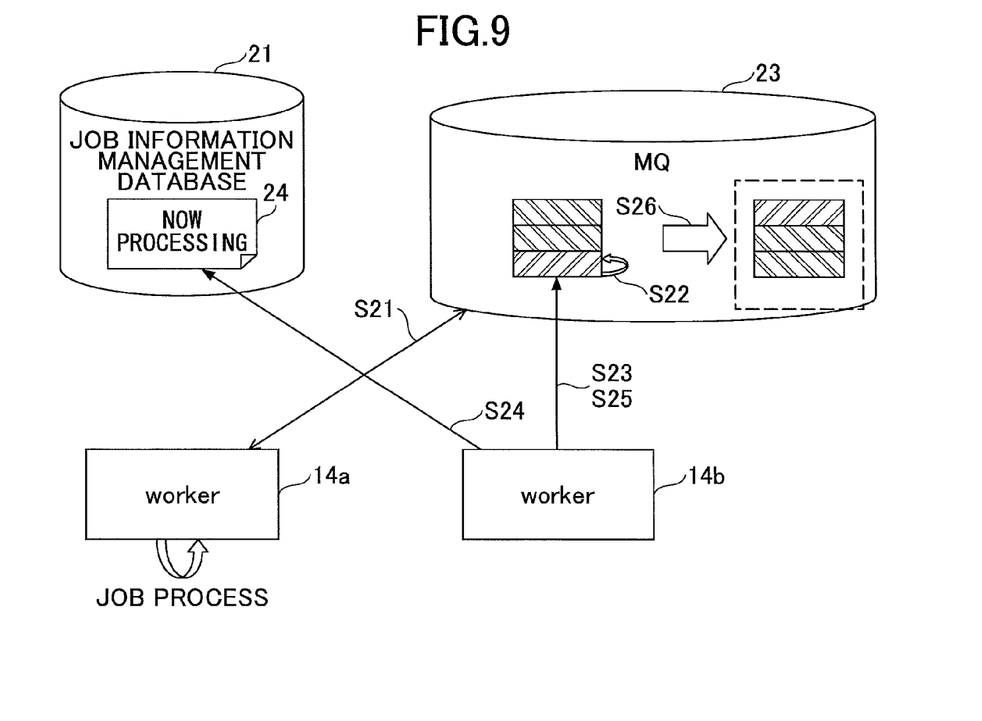
FIG. 9 is an explanatory chart illustrating an example indicative of a procedure when the connection between the message queue and the job process apparatus is cut off in the job process system of the embodiment.

FIG. 9 is an explanatory chart illustrating an example indicative of a procedure when the connection between the MQ and the job process apparatus is cut off in the job process system of the first embodiment. FIG. 9 illustrates a process in a case where the connection between the job process apparatus 14a and the MQ 23 is cut off in step S13 of FIG. 8.

In step S21, the MQ 23 detects that the connection with the job process apparatus 14a is cut off. However, the job process apparatus 14a continues to perform the job process after the connection with the MQ 23 is cut off.

The MQ 23, which detects that the connection with the job process apparatus 14a is cut off, updates the message acquired by the job process apparatus 14a so as to be in a state where the message can be acquired in step S22.

In step S23, the job process apparatus 14b monitoring the same queue of the MQ 23 as that in the job process apparatus 14a acquires the message updated in step S22 to be in the state where the message can be acquired.

In step S24, the job process apparatus 14b acquires the task information of the task information table 24 and checks whether the task information of the job process corresponding to the message acquired from the MQ 23 in step S23 is written in the task information table 24.

Because the task information of the job process corresponding to the message acquired from the MQ 23 is written in the task information table 24 in step S23, the job process apparatus 14b checks the state of the task corresponding to the task information.

The state control unit 34 of the job process apparatus 14b determines that the job process corresponding to the message acquired from the MQ 23 in step S23 because the state of the checked task is "now processing". In step S25, the message queue control unit 37 of the job process apparatus 14b causes the message acquired from the MQ 23 in step S23 to be reregistered (requeued) in the MQ 23 and another message is processed with priority.

After the process of step S25, the job process apparatus 14b acquires the message from the queue by which the MQ 23 is monitored and preforms the process of step S24. Because the message of the job process performed by the job process apparatus 14*a* is reregistered in step S25, the other message is read out from the MQ 23 with priority.

As such, in the procedure illustrated in FIG. 9, the task information of the job process corresponding to the message acquired from the MQ 23 is acquired and the state of the task corresponding to the task information is checked. Therefore, even in a case where the connection is cut off, it is possible to check that the job is being performed by the other job process apparatus. As a result, the job process system 1 can prevent the job process from being redundantly performed by the job process apparatuses 14 which monitor the same queue.

Figure 10:
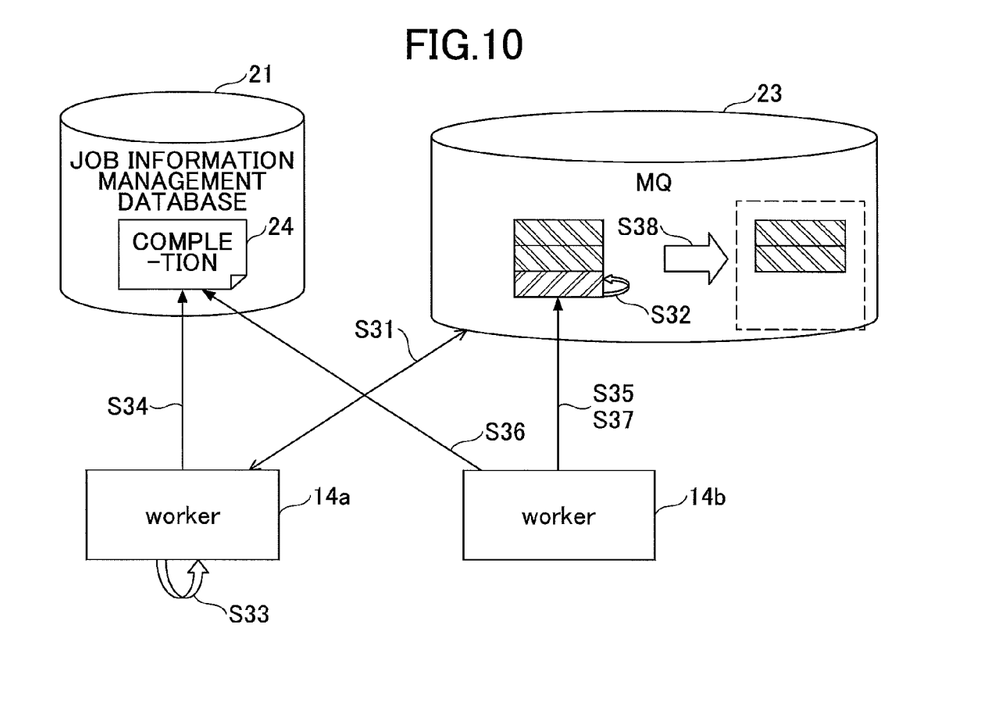
FIG. 10 is an explanatory chart illustrating another example indicative of the procedure when the connection between the message queue and the job process apparatus is cut off in the job process system of the embodiment.

FIG. 10 is an explanatory chart illustrating another example indicative of the procedure when the connection between the MQ and the job process apparatus is cut off in the job process system of the embodiment. FIG. 10 illustrates a process in a case where the connection between the job process apparatus 14*a* and the MQ 23 is cut off in step S13 of FIG. 8 in a manner similar to FIG. 9.

In step S31, the MQ 23 detects that the connection with the job process apparatus 14*a* is cut off. However, the job process apparatus 14*a* continues to perform the job process after the connection with the MQ 23 is cut off.

The MQ 23, which detects that the connection with the job process apparatus 14*a* is cut off, updates the message acquired by the job process apparatus 14*a* so as to be in a state where the message can be acquired in step S32. In step S33, the job process apparatus 14*a* completes the job process. After the job process is completed, the job process apparatus 14*a* goes to step S34 and requests the job information management database 21 to update the state of the task of the completed job process from "now processing" to "completion".

In step S35, the job process apparatus 14*b* monitoring the same queue of the MQ 23 as that in the job process apparatus 14*a* acquires the message updated in step S32 to be in the state where the message can be acquired.

In step S36, the job process apparatus 14*b* acquires the task information of the task information table 24 and checks whether the task information of the job process corresponding to the message acquired from the MQ 23 in step S35 is written in the task information table 24.

Because the task information of the job process corresponding to the message acquired from the MQ 23 is written in the task information table 24 in step S35, the job process apparatus 14*b* checks the state of the task corresponding to the task information.

The state control unit 34 of the job process apparatus 14*b* determines that the job process corresponding to the message acquired from the MQ 23 in step S35 because the state of the checked task is "completion". In step S37, because the message queue control unit 37 of the job process apparatus 14*b* completes the job process corresponding to the message acquired from the MQ 23 in step S35, the message queue control unit 37 causes the message acquired in step S35 to be deleted.

After the process of step S37, the job process apparatus 14*b* acquires the message from the queue by which the MQ 23 is monitored and preforms the process of step S36. The job process apparatus 14*b* causes the message of the job process completed by the job process apparatus 14*a* to be deleted by the job process apparatus 14*b* in place of the job process apparatus 14*a* whose connection is cut off.

As such, in the procedure illustrated in FIG. 10, the task information of the job process corresponding to the message acquired from the MQ 23 is acquired and the state of the task corresponding to the task information is checked. Therefore, it is possible to check that the job is being performed by the other job process apparatus. As a result, the job process system 1 can prevent the job process from being redundantly performed by the job process apparatuses 14 which monitor the same queue.

Figure 11:
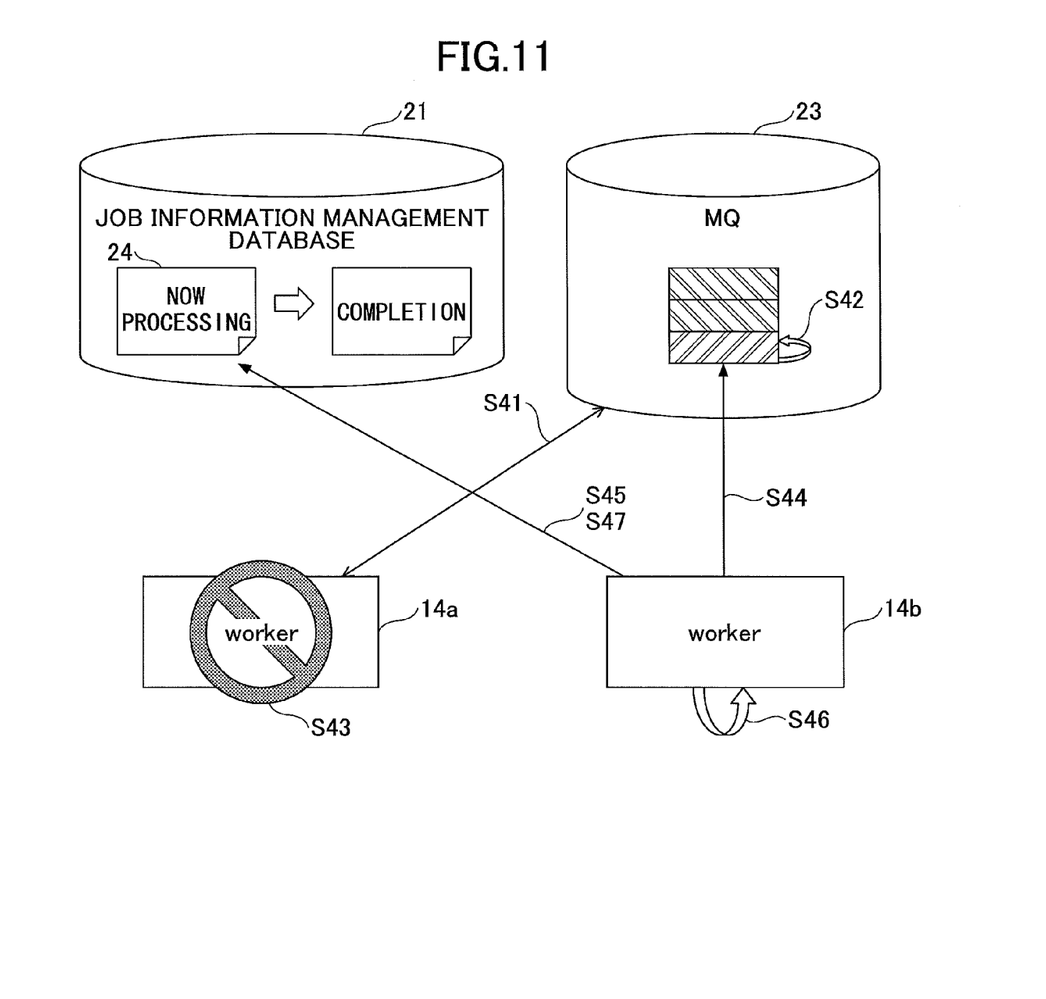
FIG. 11 is an explanatory chart illustrating another example indicative of the procedure when the connection between the message queue and the job process apparatus is cut off in the job process system of the embodiment.

FIG. 11 is an explanatory chart illustrating another example indicative of the procedure when the connection between the MQ and the job process apparatus is cut off in the job process system of the first embodiment. FIG. 11 illustrates a process in a case where the connection between the job process apparatus 14*a* and the MQ 23 is cut off in step S13 of FIG. 8 in a manner similar to FIG. 9.

In step S41, the MQ 23 detects that the connection with the job process apparatus 14*a* is cut off. Described here is a case where the job process apparatus 14*a* stops the job process by any reason such as a failure before the job process is completed after the connection with the MQ 23 is cut off.

The MQ 23, which detects that the connection with the job process apparatus 14*a* is cut off, updates the message acquired by the job process apparatus 14*a* so as to be in a state where the message can be acquired in step S32. In step S43, the job process apparatus 14*a* stops the job process before completing the job process. Described here is a case where the job process apparatus 14*a* could not request the job information management database 21 to update the job process stopped before the job process is completed from "now processing" to "completion".

In step S44, the job process apparatus 14*b* monitoring the same queue of the MQ 44 as that in the job process apparatus 14*a* acquires the message updated to be in the state where the message can be acquired in step S42.

In step S45, the job process apparatus 14*b* acquires the task information of the task information table 24 and checks whether the task information of the job process corresponding to the message acquired from the MQ 23 in step S44 is written in the task information table 24.

Because the task information of the job process corresponding to the message acquired from the MQ 23 is written in the task information table 24 in step S44, the job process apparatus 14*b* checks the state of the task corresponding to the task information. The state control unit 34 of the job process apparatus 14*b* checks that the state of the checked task is "now processing".

However, in the procedure illustrated in FIG. 11, the job process apparatus 14*a* checks whether the state of the task of the job process continues to be "now processing" for a predetermined time in order to determine whether the job process is being performed or is stopped by the job process apparatus 14*a*. When the predetermined time does not pass after the state of the task of the job process becomes "now processing", this job process is determined that this job process is being performed (now processing), and a process similar to step S25 of FIG. 9 is performed.

Further, when the task of the job process continues to be "now processing" for a predetermined time, it is determined that this job process is stopped, and it is also determined that the job process corresponding to the message acquired from the MQ 23 is performed in step S44. In step S46, the job process apparatus 14*b* performs the job process and completes the job process. After the job process is completed, the job process apparatus 14*b* goes to step S47 and requests the job information management database 21 to update the state of the task of the completed job process from "now processing" to "completion".

Further, because the message queue control unit 37 of the job process apparatus 14*b* completes the job process corresponding to the message acquired from the MQ 23 in step S44, the message queue control unit 37 causes the message acquired in step S44 to be deleted.

As such, in the procedure illustrated in FIG. 11, the task information of the job process corresponding to the message acquired from the MQ 23 is acquired and the state of the task corresponding to the task information is checked. Therefore, it is possible to detect the job process stopped before the other job process apparatus completes the job process. As a result, in the job process system 1 of the first embodiment, the job process stopped before the completion by any reason can be taken over by another job process apparatus 14.

The job process is determined to be in a stopped state when a predetermined time passes while the job process is being stopped. The predetermined time can be appropriately set depending on properties or operational policy of the job process system 1, the kind of the job process, or the like.

Figure 12:
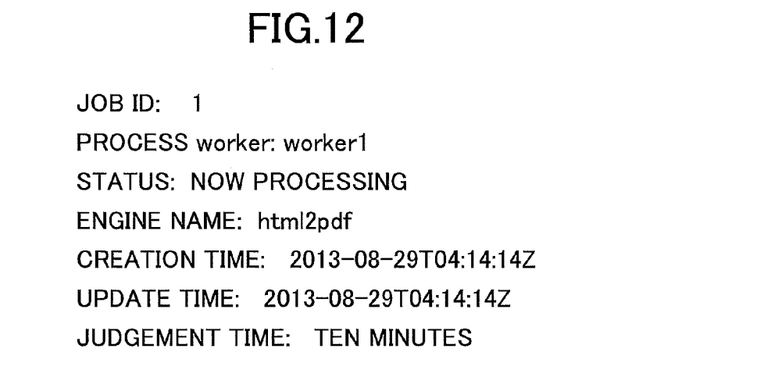
FIG. 12 is a structural view of an example of task information.

For example, a determination time for determining that the job process is being stopped in response to, for example, the kind of the job process may be set as an item of the task information as illustrated in FIG. 12. For example, in a case of the task information illustrated in FIG. 12, when the process of step S45 is performed at a time of 2013-08-29T 04:19:14 Z (after 5 minutes), the job process apparatus 14a determines that the job process is being performed (now processing) and a process similar to step S25 illustrated in FIG. 9 is performed.

Meanwhile, step S45 is performed at 2013-08-29T 04:25:14 Z (after 11 minutes), "10 minutes" of the determination time or longer passes after the state of the task changes to "now processing", the job process apparatus 14b determines that the job process is stopped. After the job process apparatus 14b updates the process worker and the update time, the job process apparatus 14b performs processes on or after step S46.

[General Overview]

As described, within the embodiment, since the job process apparatus 14 performing the job checks the state of the task corresponding to the task information before the job process apparatus 14 performs the job process, it is possible to check the job process which is being performed by the job process apparatus 14 or is possibly being performed by the job process apparatus 14. Accordingly, within the embodiments, it is possible to prevent the job process from being redundantly performed.

The MQ 23 is an example of a holding unit. The job process apparatus (worker) 14 is an example of a processing unit. The task information table 24 is an example of a memory unit. The task information acquisition unit 33 is an example of a state acquiring unit. The state control unit 34 is an example of a state controlling unit. A message queue control unit 37 is an example of a hold controlling unit. A processing request waiting for processing is an example of a request for the job process where a message is input into a queue of the MQ 23.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2013-249143, filed on Dec. 2, 2013, the entire contents of which are incorporated herein by reference.

What is claimed is:

1. An information processing system including at least one information processing apparatus, the information processing system comprising:
   a holding unit that holds a processing request waiting for a processing;
   a plurality of processing units that monitors the holding unit, acquires the processing request waiting for the processing which is held by the holding unit, and performs the processing corresponding to the processing request waiting for the processing; and
   a memory unit that stores information of a state of the processing request,
   wherein each of the plurality of processing units includes
      a state acquiring unit that acquires information indicative of the state of the acquired processing request waiting for the processing from the memory unit,
      a state controlling unit that checks the information indicative of the state of the acquired processing request waiting for the processing, and controls whether the processing corresponding to the acquired processing request waiting for the processing is performed based on a result of checking the information indicative of the state of the acquired processing request waiting for the processing, and
      a hold controlling unit that controls the holding unit,
   wherein, in response to an event where the information indicative of the state of the acquired processing request waiting for the processing indicates that another one processing unit among the plurality of processing units is performing the processing, the state controlling unit controls such that the processing corresponding to the acquired processing request waiting for the processing is not preformed, and the hold controlling unit controls such that the holding unit holds the acquired processing request waiting for the processing again, and
   wherein, in response to an event where the information indicative of the state of the acquired processing request waiting for the processing indicates that the another one processing unit among the plurality of processing units completes the processing, the state controlling unit controls such that the processing corresponding to the acquired processing request waiting for the processing is not performed, and the hold controlling unit controls such that the acquired processing request waiting for the processing is deleted from the holding unit.

2. An information processing system including at least one information processing apparatus, the information processing system comprising:
   a holding unit that holds a processing request waiting for a processing;
   a plurality of processing units that monitors the holding unit, acquires the processing request waiting for the processing which is held by the holding unit, and performs the processing corresponding to the processing request waiting for the processing; and
   a memory unit that stores information of a state of the processing request,
   wherein each of the plurality of processing units includes
      a state acquiring unit that acquires information indicative of the state of the acquired processing request waiting for the processing from the memory unit, and
      a state controlling unit that checks the information indicative of the state of the acquired processing request waiting for the processing, and controls whether the processing corresponding to the acquired processing request waiting for the processing is performed based on a result of checking the information indicative of the state of the acquired processing request waiting for the processing, wherein the state controlling unit controls such that the process corresponding to the acquired processing request waiting for the processing is performed and simultaneously causes the memory unit to store the information indicative of the state of the acquired processing request waiting for the processing so that the information indicative of the state of the acquired processing request waiting for the processing indicates that the processing is being performed by the processing unit in response to an event where the state acquiring unit cannot acquire the acquired information indicative of the state of the acquired processing request waiting for the processing.

3. An information processing system including at least one information processing apparatus, the information processing system comprising:

a holding unit that holds a processing request waiting for a processing;

a plurality of processing units that monitors the holding unit, acquires the processing request waiting for the processing which is held by the holding unit, and performs the processing corresponding to the processing request waiting for the processing; and a memory unit that stores information of a state of the processing request, wherein each of the plurality of processing units includes
a state acquiring unit that acquires information indicative of the state of the acquired processing request waiting for the processing from the memory unit, and
a state controlling unit that checks the information indicative of the state of the acquired processing request waiting for the processing, and controls whether the processing corresponding to the acquired processing request waiting for the processing is performed based on a result of checking the information indicative of the state of the acquired processing request waiting for the processing, wherein the holding unit is a queue, wherein the acquired processing request waiting for the processing is updated so as to be acquirable from another one processing unit among the plurality of processing units when a cut off of a connection with the processing unit that acquired the acquired processing request waiting for the processing is detected while the processing unit is performing the acquired processing request waiting for the processing.

* * * * *